United States Patent [19]

Zaroor

[11] 4,290,197
[45] Sep. 22, 1981

[54] HAND-UTENSIL PARTICULARLY USEFUL FOR REMOVING THE PEEL OF CITRUS FRUIT

[76] Inventor: Shlomo Zaroor, 105 Krinitzi St., Ramat Gan, Israel

[21] Appl. No.: 133,822

[22] Filed: Mar. 25, 1980

[51] Int. Cl.³ .............................................. A47J 17/04
[52] U.S. Cl. .................................................... 30/123.7
[58] Field of Search ................... 30/123.5, 123.6, 123.7

[56] References Cited

U.S. PATENT DOCUMENTS

| 518,501 | 4/1894 | Hale | 30/123.7 |
|---|---|---|---|
| 2,546,032 | 3/1951 | Holmberg | 30/123.5 |
| 2,549,326 | 4/1951 | Moore | 30/123.7 |
| 3,286,346 | 11/1966 | Perry | 30/123.5 |

FOREIGN PATENT DOCUMENTS 418097  2/1947  Italy .................................. 30/123.5

Primary Examiner—Jimmy C. Peters
Attorney, Agent, or Firm—Benjamin J. Barish

[57] ABSTRACT

A hand-utensil particularly useful for removing the peel of citrus fruit is described, comprising a handle, a blade-like member curved at its outer tip, and a curved cutting element secured to the blade-like member such that the curved cutting element may first be used for removing a strip of the citrus peel around its circumference, after which the blade-like member may be inserted between the fruit and its remaining peel on both sides of the removed strip to remove same.

4 Claims, 5 Drawing Figures

HAND-UTENSIL PARTICULARLY USEFUL FOR REMOVING THE PEEL OF CITRUS FRUIT

BACKGROUND OF THE INVENTION

The present invention relates to hand utensils particularly useful for removing the peel of oranges or other citrus fruit.

Oranges are usually peeled by the use of a conventional knife, either by cutting the peel spirally to remove it in the form of a continuous strip, or by slitting the peel along a plurality of semi-circular arcs to form separate peel sections and then removing each such section. Both procedures are relatively time-consuming and tedious. It has also been proposed to use a special peeler type of utensil having a pair of closely spaced blades, the peel being received between the blades and removed in the form of a continuous strip, in a similar manner as in the well-known potato peeler, but this procedure is substantially no less time-consuming and tedious than that using a conventional knife.

BRIEF SUMMARY OF THE INVENTION

According to a broad aspect of the present invention, there is provided a hand-utensil particularly useful for removing the peel of oranges or other citrus fruit characterized in that it includes a handle and a blade-like member having a curved cutting element secured to it at an axis substantially perpendicular to that of the handle. The blade-like member is fixed at its inner end to the handle and extends substantially axially thereof but is curved at its outer tip. The arrangement is such that the curved cutting element may first be used for removing a central circumferential strip of the citrus peel, after which the blade-like member may be used for removing the remainder of the peel by inserting it between the fruit and the peel on both sides of the removed strip.

The blade-like member is constituted of a pair of parallel, spaced rod-shaped arms converging together at the outer curved tip. The curved cutting element is formed in a transversely-extending strip fixed between the parallel spaced arms by being pressed outwardly from a section of the strip. In addition, the transversely-extending strip further includes an extension laterally of the curved cutting element and having a straight edge for facilitating removing any remaining fragments of the fruit peel.

As will be described more particularly below, the invention enables low-cost and durable hand utensils to be constructed which are particularly useful for removing the peel of oranges or other citrus fruit in a simple, quick and efficient manner.

Further features and advantages of the invention will be apparent from the description below.

BRIEF DESCRIPTION OF THE DRAWINGS

The invention is herein described, by way of example only with reference to the accompanying drawings, wherein.

DESCRIPTION OF A PREFERRED EMBODIMENT

Figure 2:
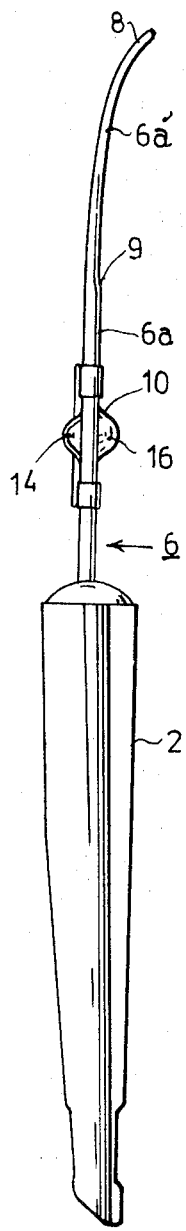
FIG. 2 is a side elevation view of the utensil of FIG. 1.
Figure 3:
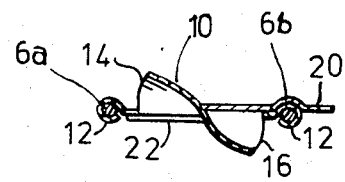
FIG. 3 is an enlarged sectional view along lines III—III of FIG. 1.
Figure 4:
FIGS. 4 and 5 are enlarged sectional views along lines IV—IV and V—V, respectively, of FIG. 1.
Figure 5:

The hand utensil illustrated in the drawings comprises a handle 2, e.g. of plastic material, formed with an opening 4 at one end to enable the utensil to be suspended from a hook or the like. The opposite end of handle 2 has attached thereto a substantially planar metal blade-like member, generally designated 6, which extends substantially axially of the handle except that it is curved at its outer tip as shown at 8 in FIG. 2. Member 6 may be conveniently provided by bending a metal rod to form a pair of parallel, spaced arms 6a, 6b which are fixed at their inner free ends to handle 2, and converge at their opposite ends to form the outer curved tip 8. The arms 6a, 6b are of circular cross-section as shown in FIG. 4, but are flattened at their outer tip 8 as shown in FIG. 5, the flattening beginning at line 9, about one-half to one-third the distance from the end of the outer tip 8.

Figure 1:
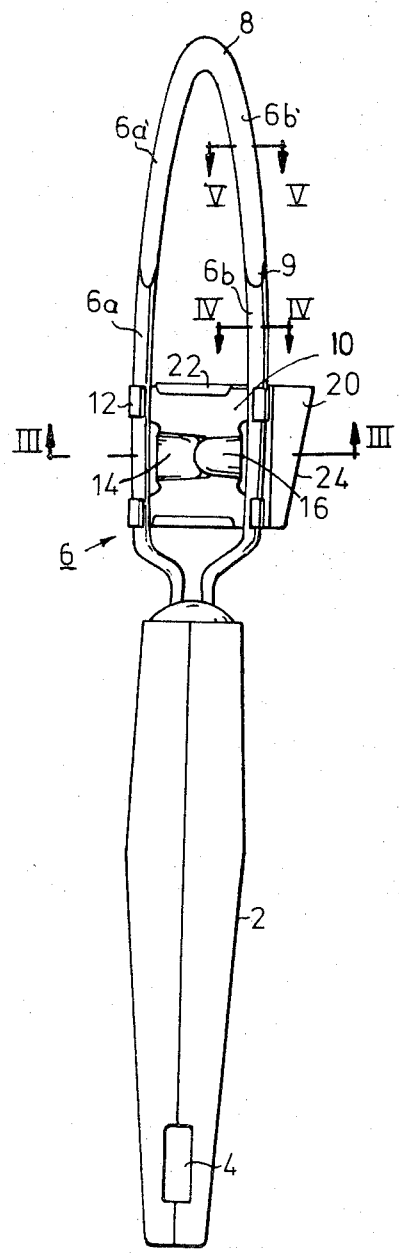
FIG. 1 is a front elevation view illustrating one form of hand utensil constructed in accordance with the present invention.

A metal strip or plate 10 is fastened transversely to the pair of arms 6a, 6b adjacent to handle 2. This may be conveniently done by forming strip 10 with four corner tabs 12 which are bent around the arms 6a, 6b as shown particularly in FIG. 1. At one edge of plate 10, the metal between the pair of tabs 12 fastened to leg 6a is pressed outwardly in one direction to form a first substantially semi-circular cutting edge 14, and the metal at the opposite edge of plate 10 between the corresponding tabs 12 fastened to the other leg 6b is similarly pressed outwardly, but in the opposite direction, to form a second substantially semi-circular cutting edge 16. Both of the circular edges 14 and 16 define curved cutting elements which may be selectively used for removing a central circumferential strip of the citrus peel. These two curved cutting elements 14 and 16 have coaxial axes substantially perpendicular to the longitudinal axes of the handle 2, so that the central circumferential strip of the citrus peel may be removed by gripping handle 2 with one hand, holding the orange (or other citrus fruit, e.g. grapefruit) with the other hand, penetrating the curved cutting edge 14 (or 16) into the central part of the peel, and rotating the utensil with respect to the orange so as to remove a central circumferential strip of the citrus peel.

As indicated earlier, the curved cutting elements 14 and 16 project from opposite sides of the utensil so that either can be selected for removing the strip of citrus peel. Cutting edge 14 may have a smaller curvature than cutting edge 16 to remove a smaller width strip of the peel. Thus, the user can select the width of the strip to be removed according to the size of the orange.

After the central circumferential strip has been removed, the peel on the opposite sides of the removed strip may be conveiently removed by inserting the curved blade 8 between the peel and the fruit, and rotating it so as to free the peel from the fruit.

The utensil illustrated in the drawings includes a further metal planar member 20 projecting laterally of strip 10 and its curved cutting elements 14 and 16. Member 20 may be attached to strip 10 by bending its opposite longitudinal edges 22 over strip 10. The projecting side edge of member 20 is cut at a bias, or acute angle, to the longitudinal axis of handle 2, as shown at 24, so as to facilitate gripping, between it and user's thumb, any remaining fragments of the peel includings its pith for removing same.

While the invention has been described with respect to one preferred embodiment, it will be appreciated that many variations and modifications can be made. For example, the curved cutting edges 14, 16 can be of substantially larger diameter than those shown; also only one such cutting edge may be included if desired. Further, the blade-like member 6 may be a flat curved strip, with or without a serrated cutting edge, for example as known in grapefruit preparing utensils.

Many other variations, modifications and applications of the illustrated embodiment of the invention will be apparent.

What is claimed is:

1. A hand utensil particularly useful for removing the peel of oranges or other citrus fruit characterized in that it includes:
    a handle;
    a blade-like member having an inner end fixed to said handle and extending substantially axially thereof, and an outer curved tip;
    and a curved cutting element secured to said blade-like member adjacent to the handle at an axis substantially perpendicular to that of the handle, such that the curved cutting elements may first be used for removing a central circumferential strip of the citrus peel, after which the blade-like member may be inserted between the fruit and its remaining peel on both sides of the removed strip for removing said remaining peel;
    said blade-like member being constituted of a pair of parallel, spaced rod-shaped arms converging together at said outer curved tip;
    said curved cutting element being formed in a transversely extending strip fixed between said parallel spaced arms by being pressed outwardly from a section of said strip;
    and said transversely extending strip further including an extension laterally of said curved cutting element and having a straight edge for facilitating removing any remaining fragments of the fruit peel.

2. The utensil according to claim 1, wherein said extension is flat and has an outer edge formed at an acute angle to the axis of the handle.

3. The utensil according to claim 1, wherein said rod-shaped arms are of circular cross-section but are flattened at said outer curved tip.

4. The utensil according to claim 1, wherein a second curved cutting element is formed in said transversely extending strip by being pressed outwardly from a section thereof, but in the opposite direction as said first-mentioned curved cutting element so as to face the opposite side of the utensil.

* * * * *